UNITED STATES PATENT OFFICE.

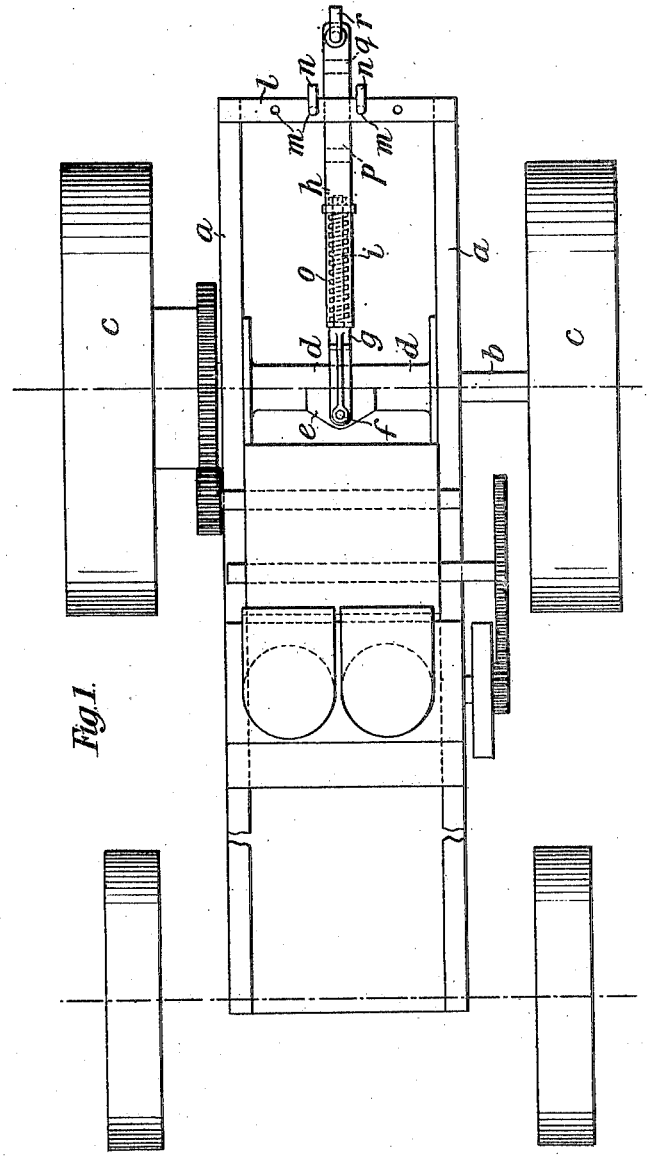

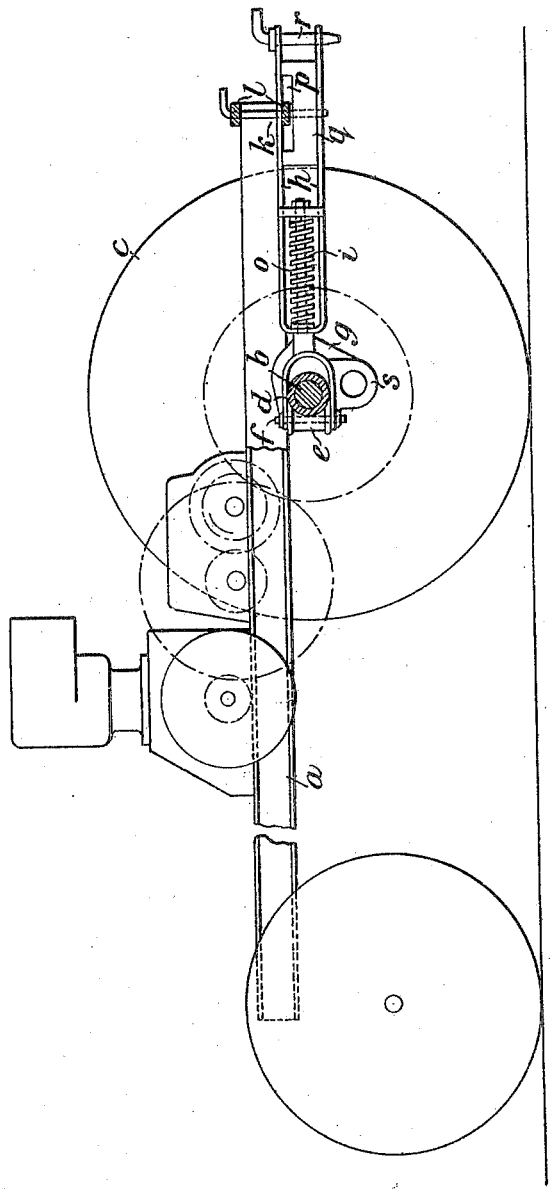

HERBERT PERCY SAUNDERSON, OF BEDFORD, ENGLAND.

DRAW-BAR FOR MOTOR-TRACTORS.

1,291,177.  Specification of Letters Patent.  Patented Jan. 14, 1919.

Application filed April 1, 1918.  Serial No. 226,067.

*To all whom it may concern:*

Be it known that I, HERBERT PERCY SAUNDERSON, a subject of the King of Great Britain, residing at Elstow Works, Bedford, England, have invented new and useful Improvements in Draw-Bars for Motor-Tractors, of which the following is a specification.

My invention relates to a novel arrangement of draw-bar for motor tractors.

According to my invention the front end of the draw-bar is pivoted upon a vertical pin at or adjacent to the center of the back axle so that the line of pull practically passes through the center or axial line of the back axle, while the rear end of the said draw-bar is adapted to swing laterally with relation to a guide fixed at the rear of the main frame of the chassis, the said guide having in connection with it means whereby the draw-bar can be fixed either centrally or on either side of the center according to requirements.

As under certain conditions of hauling there is a tendency for the driving pinion engaging with the gear wheel on the traveling wheel to run up the said gear wheel and so lift the front of the tractor from the ground, or considerably reduce the weight resting on the front wheels, whereby the efficiency of the steerage is impaired, particularly on wet or slippery land, I advantageously provide below the level of the axle an eye to or through which a hauling rope or chain can be connected or passed whereby the line of draft can be placed considerably below the ordinary draft bar.

I prefer to construct the draft bar in two sections adapted to slide with relation to one another and to arrange a spiral or other spring between these sections.

My invention will be readily understood by reference to the accompanying drawings, in which:—

Figure 1 is a plan of so much of a motor tractor as is necessary to illustrate the application of my invention; and Fig. 2 is a sectional side view.

$a$ indicates the frame or chassis of the tractor and $b$ the main axle upon which the traveling wheels $c$, $c$ are mounted, the said axle, as shown, being passed through a sleeve or bearing $d$ fixed between the sides of the chassis. This sleeve has formed upon it an enlargement or bracket $e$ which is adapted to receive the pin $f$ to which the draw-bar is connected. The draw-bar, as shown, is constructed with two sections $g, h$, the former of which is of fork shape, so as to straddle the fitting or sleeve $d$, while the part $h$ is in the form of a stirrup, one end of which slides upon the shank $i$ of the fork $g$ while the other end moves in connection with a guide $k$ formed between two bars $l$ at the rear end of the chassis. The said bars $l$, $l$ have formed in them a series of holes $m$ into which pins $n$ can be inserted, the said holes or pins permitting of fixing the draw-bar either centrally, as shown in Fig. 1, or to one side or the other of the axial line, according to requirements. $o$ is a spring which is inserted between the two sections of the draw-bar, to give an elastic or resilient pull.

As shown, only the upper member of the section $h$ of the draw-bar passes through the guide $k$ between the bars $l$, $l$ a slot $p$ being formed in the distance piece $q$ between the two members of the said section $h$, in order to afford the necessary space to allow of the lateral movement of the draw-bar with relation to the guide. If desired, however, both members of the stirrup may be passed between the bars $l$, $l$ and in this case the section $g$ of the draw-bar, instead of straddling the axle, will be connected to a pivot pin which may extend above or below the axle, the said pin being mounted in any convenient manner upon the sleeve $d$ or the bracket $e$ thereon.

The rear end of the draw-bar is provided with a coupling pin $r$, in the usual manner.

$s$ indicates the eye arranged below the axle $b$ for enabling the point of draft to be temporarily lowered. In the case where the draw-bar straddles the axle, as shown in the drawing, this eye is formed upon the underside of the fork, but in the case where the draw-bar is arranged above the axle then the said eye may be lower or formed upon the underside of the sleeve $d$.

Claims.

1. The combination with a vehicle having a horizontally disposed guide and an axle, of a member pivotally secured to the axle for horizontal movement, another member slidably connected to the first member and having a portion engaging said guide, one of said members having a shank and the other member having a stirrup-shaped part engaging the shank, and a spring interposed between the stirrup-shaped part and an end of the shank for normally retaining the members in fixed relation but permitting the members to be extended relative to each other when the axle moves away from a vehicle connected to the rear end of the second member.

2. The combination with a draw-bar arranged as claimed in claim 1, of an eye arranged below the axle and to which a draft member from the vehicle being hauled, is adapted to be connected.

HERBERT PERCY SAUNDERSON.